United States Patent [19]

Abe et al.

[11] Patent Number: 5,436,796
[45] Date of Patent: Jul. 25, 1995

[54] SOLID ELECTROLYTIC CAPACITOR AND PROCESS FOR PRODUCING THE SAME

[75] Inventors: Masao Abe; Keisuke Kii; Yoshihiro Uetani; Akira Ohtani, all of Osaka, Japan

[73] Assignee: Nitto Denko Corporation, Osaka, Japan

[21] Appl. No.: 303,738

[22] Filed: Sep. 9, 1994

[30] Foreign Application Priority Data

Sep. 9, 1993 [JP] Japan .................... 5-224751

[51] Int. Cl.⁶ .................. H01G 9/028; H01G 9/15
[52] U.S. Cl. ........................... 361/525; 427/80; 29/25.03; 252/511
[58] Field of Search ............... 361/523–525, 361/528, 529; 252/500, 511; 427/58, 79, 80, 385.5; 29/25.03

[56] References Cited

U.S. PATENT DOCUMENTS

| | | | |
|---|---|---|---|
| 4,780,796 | 10/1988 | Fukuda et al. | 361/525 |
| 5,205,965 | 4/1993 | Uetani et al. | 252/500 |
| 5,223,002 | 6/1993 | Ross | 29/25.03 |
| 5,264,552 | 11/1993 | Abe et al. | 528/422 |
| 5,324,815 | 6/1994 | Ohtani et al. | 528/422 |

FOREIGN PATENT DOCUMENTS

| | | | |
|---|---|---|---|
| 63-173313 | 7/1988 | Japan | H01G 9/02 |
| 1253226 | 10/1989 | Japan | H01G 9/02 |
| 335516 | 2/1991 | Japan | H01G 9/02 |
| 53138 | 1/1993 | Japan | H01G 9/02 |

*Primary Examiner*—Mark H. Paschall
*Assistant Examiner*—Michael D. Switzer
*Attorney, Agent, or Firm*—Sughrue, Mion, Zinn, Macpeak & Seas

[57] ABSTRACT

A solid electrolytic capacitor comprising a film-forming metal, a dielectric oxide film formed thereon, and an electrically conductive composite polymer film formed on the dielectric oxide film as a solid electrolyte, the electrically conductive composite polymer film comprising (a) a polyaniline as a first polymer soluble in an organic solvent in an undoped state, which is a polymer having a quinonediimine structural unit and a phenylenediamine structural unit represented by following formula (I) as the main repeating unit;

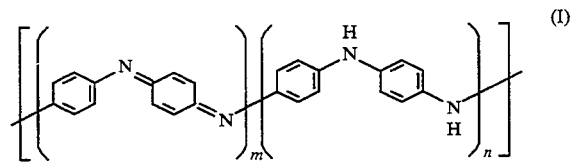

wherein m and n are the molar fractions of the quinonediimine structural unit and the phenylenediamine structural unit, respectively, and $0<m<1$, $0<n<1$, and $m+n=1$, (b) a second polymer selected from a polymer having a structure containing an ester group or an amido group in a main chain or a side chain as the main repeating unit and a cellulose derivative, and (c) a protonic acid having a pKa value of 4.8 or less.

4 Claims, No Drawings

SOLID ELECTROLYTIC CAPACITOR AND PROCESS FOR PRODUCING THE SAME

FIELD OF THE INVENTION

The present invention relates to a solid electrolytic capacitor using an electrically conductive organic polymer as a solid electrolyte and a process for the producing the same.

BACKGROUND OF THE INVENTION

An electrolytic capacitor is conventionally constructed by applying the electrolytic oxidation treatment to the surface of a metal foil or a sintered metal composed of aluminum or tantalum to form an insulating film and using the insulating film as a dielectric film.

As the recent main technical requirements for an electrolytic capacitor, there are the reduction of the size, lowering of the impedance with the increase of the frequency of a circuit, a high reliability, the reduction of cost, etc. For these requirements, in the field of an aluminum electrolytic capacitor, an investigation for using a solid electrolyte for an electrolytic capacitor in place of a liquid electrolyte conventionally used for an electrolytic capacitor has been made and as such a solid electrolyte, various electrically conductive polymers such as polypyrrole, polythiophene, polyfuran, and polyaniline are proposed.

More in detail, for example, JP-A-63-173313 (the term "JP-A" as used herein means an "unexamined published Japanese patent application") describes that an oxidized dielectric film is formed on a film-forming metal, polypyrrole is deposited thereon by the chemically oxidative polymerization of pyrrole to form an electrically conductive layer, the pyrrole is further electrolytically polymerized utilizing the conductive layer, and the electrically conductive polymer comprising the polypyrrole is deposited on the chemically oxidative polymerized polypyrrole as a solid electrolyte. Also, JP-A-1-253226 similarly describes that an electrically conductive layer comprising manganese dioxide is formed on a dielectric film and polypyrrole or polythiophene is deposited thereon by an electrolytic polymerization to form a solid electrolyte.

However, in these methods as described above, it is necessary to deposit polypyrrole, etc., by an electrolytic reaction on a dielectric film or coating, which is not essentially an electric conductor, and there is a problem in this point. That is, in these methods, the chemically oxidative polymerized film layer or the manganese dioxide layer must be formed on the dielectric film as an electrically conductive layer which is used as an electrode for the electrolytic polymerization and by forming the layer, the electrolytic polymerization can be first practiced.

Thus, JP-A-3-35516 proposes a method of preparing a solution of polyaniline soluble in a solvent, coating the solution on a dielectric film to form a polyaniline film, and immersing the polyaniline film in a solution of a protonic acid to apply a doping treatment. According to the method, an electrically conductive polyaniline film can be formed on the dielectric film by a simple means without need of forming an electrode and hence the method is advantageous in the points of the production efficiency and the cost as compared with the above-described methods.

Furthermore, in the case of using the electrically conductive film comprising the soluble polyaniline as described above, there is sometimes a problem in the adhesion between the dielectric film and polyaniline and it is proposed in JP-A-5-3138 that the problem is solved by mixing the soluble polyaniline with an aromatic polyamic acid, a soluble aromatic polyimide, a polyalkylene glycol, a polymer of a vinyl compound, etc., in an amount of from 1 to 25% by weight, preferably from 2 to 15% by weight, and more preferably from 3 to 10% by weight, based on the weight of the polyaniline.

However, the solid electrolytic capacitor obtained by such a method may show an excellent performance in a capacitance efficiency, tan δ, a high frequency impedance, etc., but a leak current is considerably large and hence there is a problem that the solid electrolytic capacitor does not have sufficient characteristics as an electrolytic capacitor.

In this case, the leak current is a very important factor in the characteristics of an electrolytic capacitor and for obtaining a practically usable electrolytic capacitor, it is necessary to reduce the value of the leak current as less as possible.

SUMMARY OF THE INVENTION

As a result of various investigations to overcome the above-described problems in the solid electrolytic capacitor utilizing the electrically conductive film obtained from the soluble polyaniline as the solid electrolyte, it has been found that by mixing a polymer having a specific chemical structure with a soluble polyaniline, forming a film of the composite polymer, and subjecting the film to a doping treatment to form an electrically conductive film, the leak current which is the serious property of an electrolytic capacitor can be sufficiently reduced to a practically usable level. The present invention has been attained based on this finding.

That is, according to the present invention, there is provided a solid electrolytic capacitor comprising a film-forming metal, a dielectric oxide film formed thereon, and an electrically conductive composite polymer film formed on the dielectric oxide film as a solid electroyte, the electrically conductive composite polymer film comprising
(a) a polyaniline as a first polymer soluble in an organic solvent in an undoped state, which is a polymer having a quinonediimine structural unit and a phenylenediamine structural unit represented by the following formula (I) as the main repeating unit

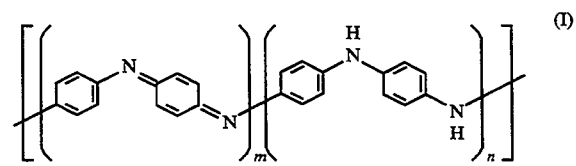

wherein m and n show the molar fractions of the quinonediimine structural unit and the phenylenediamine structural unit, respectively, in the repeating unit, and $0<m<1$, $0<n<1$, and $m+1=1$, (b) a second polymer selected from a polymer having a structure containing an ester group or an amido group at the main chain or a side chain as a main repeating unit and a cellulose derivative, and (c) a protonic acid having a pKa value of 4.8 or less.

DETAILED DESCRIPTION OF THE INVENTION

The present invention is described in detail below.

In the present invention, as the film-forming metal, aluminum or tantalum is generally used but, if necessary, other metals or composite metals such as alloys, etc., can be used. A dielectric film is formed on the film-forming metal to form an anode body of the electrolytic capacitor.

In the present invention, the polyaniline used as the first polymer is a polyaniline soluble in a solvent in an undoped state and is shown by the formula (I) described above. The production of the polyaniline, the undoping method, the solubility thereof in solvents, etc., are described in detail in JP-A-3-28229. In particular, it is preferred that the intrinsic viscosity [η] of the polyaniline measured in N-methylpyrrolidone at 30° C. is at least 0.40 dl/g. Thus, the polyaniline used in the present invention is distinguished in the points that the molecular weight thereof is high and the polymer is soluble in a solvent, from the conventional polyanilines as described in JP-A-3-28229 and is further structurally distinguished from the conventional polyanilines.

The polyaniline used in the present invention, which is the polymer having the quinonediimine structural unit and the phenylenediamine structural unit shown by the formula (I) described above as the main repeating unit and is soluble in an organic solvent in an undoped state (hereinafter, the polyaniline is referred to as undoped polyaniline) can be obtained by gradually adding an aqueous solution of an oxidizing agent having a standard electrode potential, which is determined as the electromotive-force in a reduction half cell reaction using a standard hydrogen electrode as the standard, of at least 0.6 volt to aniline in a solvent in the presence of a protonic acid having the acid dissociation constant pKa value of 3.0 or less while keeping the temperature below 5° C., and preferably below 0° C., in an amount of at least 2 equivalents, and preferably from 2 to 2.5 equivalents, the equivalent being defined as the amount that 1 mole of the oxidizing agent is divided by the number of electrons necessary for reducing one molecule of the oxidizing agent, per mole of aniline to form the oxidized polymer of aniline doped with the protonic acid (hereinafter referred to as a "doped polyaniline") and then un-doping the doped polyaniline with a basic material.

The polyaniline obtained by oxidative polymerizing aniline in the presence of the protonic acid to obtain a polyaniline and undoping the polyaniline as described above has a high molecular weight and can be dissolved in various organic solvents.

Examples of the organic solvent are N-methyl-2-pyrrolidone, N,N-dimethylacetamide, N,N-dimethylformamide, dimethyl sulfoxide, 1,3-dimethyl-2-imidazolidinone, sulforan, etc.

The solubility of the undoped polyaniline depends upon the average molecular weight of the undoped polyaniline and the kind of the solvent used, but usually from 0.5% to 100% of the polymer is dissolved and a solution of from 1 to 30% by weight of the undoped polyaniline can be obtained. In particular, the undoped polyaniline shows a high solubility in N-methyl-2-pyrrolidone, usually from 20% to 100% of the polymer is dissolved in the solvent, and the solution of from 3 to 30% by weight of the undoped polyaniline in N-methyl-2-pyrrolidone can be obtained. However, the undoped polyaniline is not dissolved in tetrahydrofuran, an aqueous 80% acetic acid solution, an aqueous 60% formic acid solution, acetonitrile, etc.

Furthermore, in the present invention, the polyaniline in the undoped state described above can be partially or completely reduced using a reducing agent. The extent of the reduction of the polyaniline can be controlled by selecting the equivalent ratio of the reducing agent to the polyaniline. By reducing the polyaniline in the undoped state as described above, the solubility of the polyaniline in an organic solvent can be increased.

The extent of the reduction of the polyaniline can be evaluated by the electronic spectrum of the solution of the polyaniline dissolved in N-methyl-2-pyrrolidone. The electronic spectrum of the N-methyl-2-pyrrolidone solution of the solvent-soluble polyaniline has the maximum absorptions at 340 nm and 640 nm. When the polyaniline shown by the formula (I) described above is completely reduced, the maximum absorption of 640 nm is vanished and the intensity of the absorption of 340 nm is increased. Therefore, it is considered that the absorption of 640 nm is originated in the quinonediimine structure and the absorption of 340 nm is originated in the phenylenediamine structure.

For the reduction of the polyaniline, hydrazines such as hydrazine hydrate, phenylhydrazine, etc.; metal hydrides such as lithium aluminum hydride, lithium borohydride, etc.; hydrogen, etc., can be suitably used. From the points that phenylhydrazine is dissolved in an organic solvent, in particular, in N-methyl-2-pyrrolidone but does not reduce N-methyl-2-pyrrolidone, phenylhydrazine is most peferably used.

In the present invention, as the solvent-soluble polyaniline, in the polyaniline shown by the formula (I) described above, the polyaniline wherein the molar fraction n of the phenylenediamine structural unit is larger than the molar fraction m of the quinonediimine structural unit is preferably used. Accordingly, the partially or completely reduced polyaniline is preferably used.

The reduction of the leak current in the solid electrolytic capacitor, which is the object of the present invention, is described below.

The leak current is an electric current passing through a defect portion of the oxide film which is the dielectric material of the electrolytic capacitor at applying a voltage and as the surface area of the dielectric is larger and as the voltage is higher, the leak current becomes larger. Thus, the amount of the leak current is frequently expressed by the product of the value of the capacitance in proportion to the dielectric surface area and the value of the applied voltage as the standard. Accordingly, when the capacitance is shown by C (μF) and the applied voltage is V (volt), the leak current (μA) is shown to the value of CV, for example, when the leak current is 1/100 of the CV value, the leak current is shown by 0.01 CV. Usually, in the electrolytic capacitor as a commercial product, the leak current must be 0.01 CV or less.

In a solid electrolytic capacitor using an electrically conductive film formed by only doping a soluble polyaniline as the solid electrolyte, the leak current is high as from about 0.1 to 0.5 CV but in the electrolytic capacitor using the electrically conductive composite polymer film obtained by mixing the polymer having the specific chemical structure as the second polymer with the soluble polyaniline as the first polymer and doping the composite polymer film obtained as the solid electrolyte according to the present invention, the leak current is blow 0.01 CV.

However, from the standpoint of obtaining a practically usable solid electrolytic capacitor, it is required that not only the solid electrolytic capacitor has less leak current but also the electrolytic capacitor has other excellent characteristis as electrolytic capacitor, such as the excellent capacitance efficiency and the excellent tan δ value. That is, the capacitance efficiency is the ratio of the capacitance obtained by using the electrically conductive film comprising the polyaniline in place of a conventional electrolyte (the electrolyte is an electrolyte solution when the electrolytic capacitor is an aluminum electrolytic capacitor and is manganese dioxide when the electrolytic capacitor is a tantalum electrolytic capacitor) to the capacitance obtained by using the conventional electrolyte shown by percentage. If the capacitance obtained in the case of using the polyaniline electrically conductive film is same as the capacitance as the case of using the conventional electrolyte, the capacitance efficiency is 100% and if the capacitance in the former case is only a half of the latter case, the capacitance efficiency is 50%. Since as the case may be, the leak current is low owing to the low capacitance efficiency, it is necessary to attain the less leak current by other factors of the solid electrolytic capacitor than the low capacitance efficiency. In the present invention, the aimed value of the capacitance efficiency is generally at least 95%.

As to the value of tan δ, the lower, the better, and the aimed value is 20% or lower in the present invention. The value of tan δ is few % or lower in the case of commercial product. It frequently happens that when the electric conductivity of the electrolyte does not become higher, the value of tan δ become larger and since in this case, the leak current becomes, as the case may be, less, it is necessary to attain the less leak current by other factors than the increase of the tan δ value.

Accordingly, in the present invention, the less leak current means that the leak current is less in addition to attaining the aimed values of the capacitance efficiency and the tan δ value.

In the present invention, the second polymer is usually largely compounded with the polyaniline as the first polymer in the range of from 10 to 300% by weight, and preferably from 25 to 150% by weight, based on the weight of the polyaniline. By compounding such a large amount of the second polymer, the amount of the second polymer which is an insulating material becomes relatively larger than the amount of the polyaniline and hence from the standpoint of common sence, it is considered that such a composite polymer will not show a high electric conductivity and hence it is considered that when such a composite polymer is used as a solid electrolyte for an electrolytic capacitor, the electric conductivity is not increased, whereby the capacitance efficiency becomes lower and the tan δ value becomes larger. In fact, JP-A-5-3138 described above described that the amount of the polymer added as a polymeric binder is from 1 to 25% by weight, and preferably from 2 to 15% by weight to the polyaniline and if the amount thereof added is too much, it gives undesirably bad influences on the induction characteristics of the electrolytic capacitor and also it is described therein that in the example, the polymeric binder is added to the polyaniline in an amount of 5% by weight to the amount of the polyaniline and in the comparative example, when polyamic acid was added to the polyaniline as the second polymer in an amount of 30% by weight to the polyaniline, tan δ became more than several tens percents.

However, in the present invention, when the second polymer having the specific chemical structure is selectively admixed with the polyaniline and film is formed using such a polyaniline composite polymer followed by applying a doping treatment, in spite of that the second polymer exists in the composite polymer in a large amount of from 10 to 300% by weight based the weight of the polyaniline, the electric conductivity of the electrically conductive film obtained from such a composite polymer is not reduced and when the electrically conductive film is used as an electrolyte for the electrolytic capacitor, the capacitance efficiency and tan δ of the electrolytic capacitor sufficiently attain the aimed values. Further, a large leak current which is a problem about a conventional solid electrolyte composed of the polyaniline only is greatly reduced by using the electrically conductive film comprising the composite polymer and the leak current can be reduced below 0.1 CV according to the present invention.

Moreover, according to the present invention, in the electrolytic capacitor using the electrically conductive film formed by applying a doping treatment to the polyaniline composite polymer comprising the polyaniline and the second polymer as the solid electrolyte, by applying a D.C. voltage under a high humidity atmosphere of a relative humidity of at least 80%, the value of the leak current can be greatly lowered to 0.1 CV or lower. The applying time of the D.C. voltage is from about 1 to 30 minutes, and preferably from about 1 to 15 minutes.

As described above, by using the electrically conductive film of the polyaniline composite polymer as the solid electrolyte of the solid electrolytic capacitor according to the present invention and applying thereto a D.C. voltage under a high humidity atmosphere, the value of the leak current can be greatly lowered.

The reason that the leak current in the solid electrolytic capacitor of the present invention is greatly decreased has not yet been clarified, but the function that the composite polymer film restrains the damage of giving to the dielectric oxide film which is coated thereon at film forming thereof and the function that water is supplied to the defect portions existing on the dielectric oxide film at the application of a D.C. voltage under a high humidity atmosphere to restore the defect portions by the anodic oxidation in the state, which results in reducing the leak current, are considered to simultaneous take part in the reduction of the leak current in the present invention.

The second polymer having the specific chemical structure used in the present invention is at least one polymer selected from a polymer having a structure containing an ester group or an amido group in the main chain or the side chain as the main repeating unit and a cellulose derivative. In the present invention, the polymer is used by adding to a polyaniline solution and hence it is necessary that the polymer is soluble in N-methyl-2-pyrrolidone which is the solvent for the polyaniline.

Specific examples of the second polymer suitably used in the present invention are described below.

As the polymer having an ester group in the main chain, there are a linear saturated polyester resin being on the market as a trade name of "VYLON" (made by Toyobo Co., Ltd.), a linear saturated polyester resin being on the market as a trade name of "elitel" (made by Unitika, Ltd.), etc. These polymers are commercially available as various types of goods and they can be all suitably used in the present invention and show a remarkable effect in the reduction of the leak current. The linear saturated polyester resins illustrated above are aliphatic polyesters, but aromatic polyesters can be used in the present invention if they are soluble in a solvent. The polymer called "polyarylate" corresponds to the aromatic polyester and is on the market from Unitika Ltd., and Kanegafuchi Chemical Industry Co., Ltd.

As the polymer having an ester group in the side chain, there are at least one kind of a (co)polymer of (meth)acrylic acid esters such as an acrylic acid ester, a methacrylic acid ester, etc., and vinyl ester compounds such as vinyl acetate, vinyl propionate, vinyl butyrate, vinyl stearate, etc., and further copolymers of these monomers and other monomers.

Specific examples of the polymer having an ester group at the side chain are polyacrylic acid esters, polymethacrylic acid esters, polyvinyl acetate, polyvinyl propionate, polyvinyl butyrate, polyvinyl stearate, etc.

The polymer having an amido group at the main chain is the polymer called a polyamide resin or a nylon resin, and very many kinds of polymers are on the market but the polymers which can be used in the present invention are those soluble in an organic solvent.

Since in polyamide resins, a strong intermolecular hydrogen bond is formed by the amido groups themselves, many polyamide resins are generally insoluble in solvents. However, a transparent nylon resin CX-3000 (trade name) being on the market from Unitika Ltd., and soluble nylons CM4000 and CM8000 being on the market from Toray Industries, Inc. are soluble in N-methyl-2-pyrrolidone and are excellent as the polymers used in the present invention. In addition to these polymers, there is further a polymer called methoxymethylated polyamide, which is the polymer obtained by methoxymethylating a part of the amido groups of a polyamide resin, and the polymer is excellent in the solubility in an organic solvent and can be suitably used in the present invention.

As the polymer having an amido group at the side chain, there are polyvinylpyrrolidone having pyrrolidone at the side chain, which is a cyclic amide, and polyacrylamides.

As the cellulose derivatives, there are a cellulose ester obtained by suitably esterifying the hydroxyl group of cellulose with an acid, a cellulose ester obtained by etherifying the hydroxyl group of cellulose, etc.

Specific examples of the cellulose ester are cellulose acetate, cellulose acetate butyrate, nitrocellulose, etc. Specific examples of the cellulose ether are methyl cellulose, ethyl cellulose, benzyl cellulose, ethylhydroxyethyl cellulose, etc.

In the present invention, the second polymer is used in an amount of usually from 10 to 400% by weight, and preferably from 20 to 300% by weight, based on the weight of the polyaniline. If the amount of the second polymer added to the polyaniline is too small, the effect of reducing the leak current in the solid electrolytic capacitor prepared cannot be obtained, while if the amount added is over the above range, the electric conductvity of the electrically conductive film is lowered, which gives a bad influence on the characteristics of the solid electrolytic capacitor.

There is no particular restriction on the protonic acid having a pKa value of 4.8 or less used in the present invention but the organic acids shown below can be preferably used. Examples of the organic acids are aliphatic, aromatic, aroaliphatic, or alicyclic monobasic or polybasic acids. These organic acids may have a hydroxyl group, a halogen atom, a nitro group, a cyano group, an amino group, etc.

Specific examples of these organic acids are acetic acid, n-butyric acid, pentadecafluorooctanic acid, pentafluoroacetic acid, trifluoroacetic acid, trichloroacetic acid, dichloroacetic acid, monofluoroacetic acid, monobromoacetic acid, monochloroacetic acid, cyanoacetic acid, acetylacetic acid, nitroacetic acid, triphenylacetic acid, formic acid, oxalic acid, benzoic acid, m-bromobenzoic acid, p-chlorobenzoic acid, m-chlorobenzoic acid, p-chlorobenzoic acid, o-nitrobenzoic acid, p-nitrobenzoic acid, m-nitrobenzoic acid, trimethylbenzoic acid, p-cyanobenzoic acid, m-cyanobenzoic acid, Thymol Blue, salicylic acid, 5-aminisalicylic acid, o-methoxybenzoic acid, 1,5-dinitro-4-chlorophenol, 2,6-dinitrophenol, p-oxybenzoic acid, bromophenol blue, mandelic acid, phthalic acid, isophthalic acid, maleic acid, fumaric acid, malonic acid, tartaric acid, citric acid, lactic acid, succinic acid, $\alpha$-alanine, $\beta$-alanine, glycine, glycolic acid, thioglycolic acid, ethylenediamine-N,N'-diacetic acid, ethylenediamine-N,N,N',N'-tetraacetic acid, etc.

The organic acid may have a sulfonic acid group or a sulfuric acid group. Specific examples of the organic acid are aminonaphtholsulfonic acid, metanilic acid, sulfanilic acid, allylsulfonic acid, laurylsulfuric acid, xylenesulfonic acid, chlorobenzenesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, benzenesulfonic acid, styrenesulfonic acid, p-toluenesulfonic acid, naphthalenesulfonic acid, ethylbenzenesulfonic acid, propylbenzenesulfonic acid, butylbenzenesulfonic acid, pentylbenzenesulfonic acid, hexylbenzenesulfonic acid, heptylbenzenesulfonic acid, octylbenzenesulfonic acid, nonylbenzenesulfonic acid, decylbenzenesulfonic acid, undecylbenzenesulfonic acid, dodecylbenzenesulfonic acid, pentadecylbenzenesulfonic acid, octadecylbenzenesulfonic acid, diethylbenzenesulfonic acid, dipropylbenzenesulfonic acid, dibutylbenzenesulfonic acid, methylnaphthalenesulfonic acid, ethylnaphthalenesulfonic acid, propylnaphthalenesulfonic acid, butylnaphthalenesulfonic acid, pentylnaphthalenesulfonic acid, hexylnaphthalenesulfonic acid, heptylnaphthalenesulfonic acid, octylnaphthalenesulfonic acid, nonylnaphthalenesulfonic acid, decylnaphthalenesulfonic acid, undecylnaphthalenesulfonic acid, dodecylnaphthalenesulfonic acid, pentadecylnaphthalenesulfonic acid, octadecylnaphthalenesulfonic acid, dimethylnaphthalenesulfonic acid, diethylnaphthalenesulfonic acid, dipropylnaphthalenesulfonic acid, dibutylnaphthalenesulfonic acid, dipentylnaphthalenesulfonic acid, dihexylnaphthalenesulfonic acid, diheptylnaphthalenesulfonic acid, dioctylnaphthalenesulfonic acid, dinonylnaphthalenesulfonic acid, trimehylnaphthalenesulfonic acid, triethylnaphthalenesulfonic acid, tripropylnaphthalenesulfonic acid, tributylnaphthalenesulfonic acid, camphasulfonic acid, acrylamido-t-butylsulfonic acid, etc.

In particular, the protonic acids which can be preferably used in the present invention are polyfunctional organic sulfonic acids having at least 2 sulfonic acid groups in the molecule.

Examples of the polyfunctional organic sulfonic acid are ethanedisulfonic acid, propanedisulfonic acid, butanedisulfonic acid, pentanedisulfonic acid, hexanedisulfonic acid, heptanedisulfonic acid, octanedisulfonic acid, nonanedisulfonic acid, decanedisulfonic acid, benzenedisulfonic acid, naphthalenedisulfonic acid, toluenedisulfonic acid, ethylbenzenedisulfonic acid, propylbenzenedisulfonic acid, butylbenzenedisulfonic acid, dimethylbenzenedisulfonic acid, diethylbenzenedisulfonic acid, dipropylbenzenedisulfonic acid, dibutylbenzenedisulfonic acid, methylnaphthalenedisulfonic acid, ethylnaphthalenedisulfonic acid, propylnaphthalenedisulfonic acid, butylnaphthalenedisulfonic acid, pentylnaphthalenedisulfonic acid, hexylnaphthalenedisulfonic acid, heptylnaphthalenedisulfonic acid, octylnaphthalenedisulfonic acid, nonylnaphthalenedisulfonic acid, dimethylnaphthalenedisulfonic acid, diethylnaphthalenedisulfonic acid, dipropylnaphthalenedisulfonic acid, dibutylnaphthalenedisulfonic acid, naphthalenetrisulfonic acid, naphthalenetetrasulfonic acid, anthracenedisulfonic acid, anthraquinonedisulfonic acid, phenanthrenedisulfonic acid, fluorenonedisulfonic acid, carbazoledisulfonic acid, diphenylmethanedisulfonic acid, biphenyldisulfonic acid, terphenyldisulfonic acid, terphenyltrisulfonic acid, a naphthalenesulfonic acid-formalin condensate, a phenanthrenesulfonic acid-formalin condensate, an anthracenesulfonic acid-formalin condensate, a fluorenesulfonic acid-formalin condensate, and a carbazolesulfonic acid-formalin condensate. In these polyfunctional organic sulfonic acids, the position of the sulfonic acid group at the aromatic ring is optional.

Moreover, the organic acid used in the present invention may be a polymer acid. Examples of the polymer acid are polyvinylsulfonic acid, polyvinylsulfuric acid, polystyrenesulfonic acid, a sulfonated styrene-butadiene copolymer, polyallylsulfonic acid, polymetallylsulfonic acid, poly-2-acrylamido-2-methylpropanesulfonic acid, halogenated polyacrylic acid, polyisoprenesulfonic acid, N-sulfoalkylated polyaniline, and nuclear sulfonated polyaniline. Also, a fluorine-containing polymer known as Nafion (trade name, made by E. I. Du Pont de Nemours and Company) can be suitably used as the polymer acid in the present invention.

In the present invention, aromatic polyvalent sulfonic acids such as 1,5-naphthalenedisulfonic acid and also polymer acids are particularly preferably used since these acids give electrically conductive polyanilines excellent in heat resistance and water resistance.

The solid electrolytic capacitor of the present invention can be obtained by forming a dielectric film by an anodic oxidation on the film-forming metal which is in a porous form for increasing the surfce area, immersing the film-forming metal having formed thereon the dielectric film in a solution of a mixture of the soluble polyaniline and the second polymer, evaporating off the solvent in a dryer to form a composite polymer film comprising the polyaniline and the second polymer on the dielectric film, and then subjecting the composite polymer film to a doping treatment to form an electrically conductive composite film.

As the case may be, the solid electrolytic capacitor of the present invention can be obtained by dissolving the protonic acid having a pKa value of 4.8 or less or the salt thereof in a solution of a mixture of the soluble polyaniline and the second polymer to prepare a mixed solution containing the soluble polyaniline, the second polymer, and the protonic acid or the salt thereof, coating the solution on the dielectric film on the film-forming metal followed by drying to form a composite polymer film, and then subjecting the composite polymer film to an oxidation treatment to form an electrically conductive composite film.

For forming the composite polymer film on the dielectric film, as other method of immersing the dielectic film formed on the film-forming metal in the solution of the composite polymer followed by drying as described above, the the solution of the composite polymer may be coated on the dielectric film and dried. Also, as other method, the solution of the composite polymer may be spilt onto the dielectric film by a means such as a dispenser, etc., or the dielectric film may be impregnated with the solution of the composite polymer in vacuo.

As the drying method, the film may be dried in an inert gas at normal pressure, may be dried at a low temperature under a reduced pressure, or may be dried by heating under a reduced pressure. That is, as described above, for drying the film, various methods can be used without particular restrictions.

The drying temperature is in the range of usually from 30° C. to 200° C., preferably from 60° C. to 180° C., and more preferably from 80° C. to 160° C. The drying time is in the range of usually from 20 minutes to 3 hours, preferably from 20 minutes to 2 hours, and more preferably from 30 minutes to 1 hours.

In the present invention, by doping the polyaniline in the composite polymer film thus obtained, the electrically conductive composite film is formed.

In the present invention, for doping the composite polymer film, there are following three methods. That is, the first method is a protonic acid doping method as described in JP-A-3-35516, the second method is an oxidative doping method as described in Japanese Patent Application No. 4-279675, and the third method is an oxidative ion-exchange doping method as described in Japanese Patent Application No. 5-175739.

The first protonic acid doping method is a method of contacting the polyaniline (oxidation-type polyaniline) having the quinonediamine structural unit and the phenylenediamine structural unit as the main repeating unit with a solution of the protonic acid having a pKa value of 4.8 or less or with the protonic acid in a nonsolvent state and maintaining them as they are until the electric conductivity of the composite polymer film is increased. In the first method, however, it takes a considerably long time to increase the electric conductivity to a desired value and hence the productivity is low for industrially practicing the first method.

The second oxidative doping method is a method for improving the delay of the doping speed in the first protonic acid doping method, that is, a method of once reducing the oxidation-type polyaniline with a reducing agent to form a polyaniline (reduction-type polyaniline) having the imino-p-phenylene structural unit as the main repeating unit and then doping the polyaniline by immersing the polyaniline-containing film in a mixed solution of an oxidizing agent and a protonic acid. The second method shows a very high doping speed as compared with the first protonic acid doping method and is suitable for the industrial practice.

The third method is a method of previously adding the protonic acid as a state of the salt thereof to a solution of the polyaniline in a reduced state, admixing the second polymer with the mixture obtained above, forming a composite polymer film from the mixture, and then doping the film by immersing it in a mixed solution of an oxidizing agent and the protonic acid. The third method is a method which can be suitably used in the case of doping a bulky protonic acid dopant which is reluctant to dope by the second oxidative doping method.

According to the present invention, by employing any of the methods described above, a solid electrolytic capacitor having formed thereon the electrically conductive composite film comprising the polyaniline, the second polymer, and the protonic acid and having an electric conductivity of from 1 to 80 S/cm as the solid electrolyte can be produced.

After applying the doping treatment, the electrically conductive composite film is washed with a proper solvent such as ethanol, acetone, etc., followed by drying. Thereafter, terminals are fitted onto the electrically conductive composite film using an electrically conductive paste such as a carbon paste, a silver paste, etc., the assembly is molded with an epoxy resin, etc., and preferably the molded assembly is subjected to an aging treatment to obtain a solid electrolytic capacitor.

In the present invention, as the film-forming metal, aluminum or tantalum is preferably used and hence as the dielectric film, the film of aluminum oxide or tantalum oxide is preferably used.

As described above, since in the solid electrolytic capacitor of the present invention, the electrically conductive composite polymer film comprising a soluble polyaniline as the first polymer, a second polymer selected from a polymer having the structure having an ester group or an amido group at the main chain or the side chain as the main repeating unit and a cellulose derivative, and a protonic acid having a pKa value of 4.8 or less is formed on the oxidized dielectric film as the solid electrolyte, the solid electrolytic capacitor shows a high capacitance efficiency and low tan δ and has the excellent characteristic that the leak current is very low.

That is, according to the present invention, by forming a composite polymer of the definite second polymer together with the polyaniline, the leak current which is from about 0.1 to 0.5 CV in the case of using the polyaniline alone can be reduced below 0.1 CV and also by compounding the second polymer, when a D.C. voltage is applied under a high humidity atmosphere, the leak current can be further reduced below 0.01 CV. Also, by forming the composite polymer of the polyaniline and the second polyemr, the polyaniline is protected from the outside environment by the second polymer to give a good effect to the durability of the solid electrolytic capacitor, whereby the solid electrolytic capacitor having a high durability can be obtained.

The present invention is described in more detail by the following referrence examples and the examples but the invention should not be limited by these examples. All percents, parts, ratios and the like are by weight unless otherwise indicated.

REFERENCE EXAMPLE 1

Production of quinonediimine-phenylenedime type electrically conductive polyaniline in doped state by the oxidative polymerization of aniline:

In a 10 liter separable flask equipped with a stirrer, a thermometer, and a straight tube adapter were placed 6,000 g of distilled water, 360 ml of 36% hydrochloric acid, and 400 g (4.295 mols) of aniline in this order and aniline was dissolved. Apart from this, 434 g (4.295 mols) of 97% concentrated sulfuric acid was added to 1,493 g of distilled water in a beaker while cooling with ice-water followed by mixing to obtain an aqueous sulfuric acid solution. The aqueous sulfuric acid solution was added to the solution in the separable flask and the whole flask was cooled to $-4°$ C. in a low-temperature bath kept at constant temperature.

980 g (4.295 mols) of ammonium peroxodisulfate was dissolved in 2,293 g of distilled water in a beaker to obtain an aqueous oxidizing agent solution.

While keeping the temperature of the reaction mixture in the flask below $-3°$ C. by cooling the whole flask in a low-temperature bath, the aqueous solution of ammonium peroxodisulfate was gradually added dropwise to the acidic aqueous solution of the aniline salt in the flask with stirring from the straight tube adapter using a tubing pump at a rate of 1 ml/minute or less. The solution which was colorless and transparent at first became from greenish blue to blackish green with the progress of the polymerization and a blackish green powder was precipitated.

At the precipitation of the powder, the temperature of the reaction mixture was raised and thus the reaction mixture was cooled to restrain the temperature in the reaction system below $-3°$ C. After the precipitation of the powder, the dropping rate of the aqueous solution of ammonium peroxodisulfate might be increased to, for example, about 8 ml/minutes. However, in this case, it was necessary to control the dropping rate such that the temperature of the reaction mixture was kept below $-3°$ C. while monitering the temperature of the reaction mixture. After completion of the dropise addition of the aqueous solution of ammonium peroxodisulfate over a period of 7 hours, the reaction mixture was further stirred for one hour at a temperature of below $-3°$ C.

The polymer powder thus obtained was collected by filtration, washed with water and then with acetone, and vucuum dried at room temperature to obtian 430 g of the blackish green quinonediimine-phenylenediamine type electrically conductive polyaniline powder.

When the polyaniline powder thus obtained was press-molded into a disk having a diameter of 13 mm and a thickness of 700 μm and the electric conductivity was measured by a Van der Pol method, the electric conductivity was 14 S/cm.

Production of quinonediimine-phenylenediamine type solvent soluble polyaniline by un-doping of an electrically conductive organic polymer:

In 4 liters of 2N aqueous ammonia was added 350 g of the doped electrically conductive polyaniline powder described above and the mixture was stirred for 5 hours by an automatic homogeneous mixer at a rotation number of 5,000 r.p.m. The color of the mixture was changed from blackish green into bluish purple.

The powder was collected by a filtration by a Buchner funnel, repeatedly washed with distlled water with stirring in a beaker until the filtrate became neutral and then washed with acetone until the filtrate became colorless. Thereafter, the powder was vacuum dried for 10 hours at room temperature to obtain 280 g of a blackish brown undoped solvent-soluble quinonediimine-phenylenediamine type polyaniline powder.

The polyaniline was soluble in N-methyl-2-pyrrolidone and the solubility was 8 g (7.4%) in 100 g of the solvent. The intrinsic viscosity [η] using the solvent at 30° C. was 1.23.

EXAMPLE 1

An etched aluminum of 70 μm in thickness and 1 cm$^2$ in area was used as a film-forming metal, a D.C. voltage of 50 volts was applied to the aluminum metal in a 3% aqueous solution of ammonium adipate at about 70° C. to form an insulating film (dielectric film) thereon, and the aluminum metal having the dielectric film was used as an anode body for a capacitor.

In 450 g of ethyl ether was dispersed 50 g of the soluble polyaniline used in the above Reference Example with stirring. To the dispersion was added 15 g of phenylhydrazine and the polyaniline was reduced at room temperature. Thereafter, the reduced polyaniline obtained was collected by filtration, washed with ether, and vacuum dried for 10 hours at room temperature.

10 g of the reduced polyaniline was dissolved in 90 g of N-methyl-2-pyrrolidone with stirring to obtain a 10% polyaniline solution and the solution was filtered under a reduced pressure by means of a G2 glass filter.

As the second polymer, a linear saturated polyester resin "VYLON RV-290" (trade name, made by Toyobo Co., Ltd.) was used and 10 g of the resin was dissolved in 90 g of N-methyl-2-pyrrolidone under stirring to obtain a 10% solution of the second polymer. The second polymer was a polymer having the structure containing an ester group in the main chain as the main repeating unit.

By mixing 50 g of the 10% polyaniline solution and 50 g of the 10% second polymer solution under mixing, a mixed solution of the soluble aniline and the second polymer was prepared. The mixed solution was placed in a succion vessel and the solution was subjected to vacuum defoaming for 30 minutes to obtain an impregnation solution for the solid electrolyte of an electrolytic capacitor.

After immersing the capacitor anode body in the mixed solution for one minute at room temperature, the anode body was dried by heating for 30 minutes at 120° C. in a hot blast circulation dryer to form a composite polymer film composed of the polyaniline and the linear saturatd polyester resin as the second polymer (the weight of the polyaniline was same as the weight of the second polymer) on the anode body. The operation was repeated three times.

After subjecting the capacitor anode body having coated thereon the composite polymer film composed of the polyaniline and the second polymer thus obtained to a doping treatment by immersing the anode body in a doping solution obtained by mixing a 30% aqueous solution of 1,2-ethandisulfonic acid and an equivalent amount of a 4.0% ethanol solution of p-benzoquinone for 30 minutes, the anode body was washed with ethanol and dried for 20 minutes at 60° C. Thereafter, an electrically conductive paste was coated thereon and electrode terminals were fitted thereto.

The aluminum electrolytic capacitor thus obtained had an electrostatic capacity of 5.75 μF at 120 Hz, the capacitance efficiency thereof was 100%, and the tangent (tan δ) of the loss angle thereof was 4.0%. Also, the equivalent series resistance thereof at 1 MHz was 150 mΩ and the leak current measured at 25 volts was 3.0 μA, which was 0.02 CV.

EXAMPLE 2

A D.C. voltage of 35 volts was applied to the electrolytic capacitor obtained in Example 1 under the atmosphere of 40° C. and a relative humidity of 90% to pass an electric current for 2 minutes. When the electrolytic capacitor was taken out from the high humidity atmosphere and after drying for about 20 minutes at 60° C., the leak current was measured at 25 volts, the leak current was 0.2 μA (0.001 CV).

EXAMPLE 3

A porous sintered body (volume 20.8 mm$^3$) obtained by sintering the fine powder of tantalum was used as the film-forming metal and by applying a D.C. voltage of 30 volts to the porous sintered body in a 0.3% aqueous solution of phosphoric acid at 90° C. to form thereon an insulating film (dielectric film), an anode body of an electrolytic capacitor was formed.

After immersing the anode body for electrolytic capacitor in a mixed solution obtained by mixing the 10% soluble polyaniline solution and the same amount of the 10% solution of the linear saturated polyester resin "VYLON RV-290" (trade name, made by Toyobo Co., Ltd.) prepare in Example 1 for one minute, the anode body was dried by heating to 120° C. for 30 minutes in a hot-blast circulating dryer to form the composite polymer film composed of the polyaniline and the second polymer (the weight of the polyaniline was same as the weight of the second polymer) on the anode body. The operation was repeated twice.

A 25% aqueous solution of sodium polyvinylsulfonic acid (made by Aldrich Co.) was treated with a cation exchange resin to convert the sulfonate into the free acid, the solution was concentrated by an evaporator to distill off all the water to obtain polyvinylsulfonic acid, and a 20% aqueous solution of polyvinylsulfonic acid was prepared using the acid thus obtained. Apart from this, a 5% ethanol solution of p-benzoquinone was prepared and mixed with the same amount of the above aqueous polyvinyl sulfonic acid solution to obtain a doping solution.

The anode body for electrolytic capacitor having coated thereon the composite polymer film of the polyaniline and the second polymer was immersed in the foregoing doping solution heated to 40° C. and after applying thereto a doping treatment for 60 minutes, the anode body was washed with ethanol and dried for 20 minutes at 60° C. Thereafter, an electrically conductive paste was coated on the anode body and electrode terminals were fitted thereto.

The tantalum electrolytic capacitor thus obtained had an electrostatic capacity of 89.2 μF at 120 Hz, the capacitance efficiency thereof was 97%, and the tangent (tan δ) of the loss angle was 2.5%. Also, the equivalent series resistance thereof at 1 MHz was 330 mΩ. The leak current measured at 10 volts was 9.8 μA (0.011 CV).

A D.C. voltage of 21 volts was applied to the electrolytic capacitor under the atmosphere of a temperature of 40° C. and a humidity of 90% as in Example 2 to pass an electric current for 2 minutes. When the electrolytic capacitor was taken out from the high humidity atmosphere and after drying the electrolytic capacitor for about 20 minutes at 60° C., the leak current was measured at 10 volts, the leak current was 1.1 μm (0.0012 CV).

EXAMPLE 4

By following the same procedure as in Example 3 using the tantalum anode body as used in Example 3 except that the kind of the second polymer was changed, each of electrolytic capacitors was prepared and the characteristics thereof were evaluated by the same manners as in Example 3. Similarly, a D.C. voltage of 21 volts was applied to each electrolytic capacitor under the atmosphere of a temperature of 40° C. and a relative humidity of 90% to pass an electric current for 2 minutes. When the electrolytic capacitor was taken out from the atmosphere and after drying for about 20 minutes at 60° C., the leak current of each electrolytic capacitor at 10 volts was measured. The results are shown in Table 1 below.

By adding the second polyaniline in an amount of 100% by weight based on the weight of the polyaniline, the leak current can be reduced. In particular, after preparing the electrolytic capacitor, by applying a D.C. voltage to the electrolytic capacitor in a high humidity atmosphere, the leak current can be greatly reduced below 0.05 CV, and further below 0.01 CV, whereby the excellent electrolytic capacitor can be obtained.

COMPARATIVE EXAMPLE 1

By following the same procedure as in Example 4 except that polyimide, "Ultem" (trade name, made by General Electric Company) as the 2nd polymer, an electrolytic capacitor was prepared and the characteristics were evaluated by the same manners as in Example 4. The results are shown in Table 1 below.

As is clear from the results shown in Table 1 below, when the polyimide was added to the polyaniline as the second polymer in an amount of 100% by weight based on the weight of the polyaniline, the characteristics of the electrolytic capacitor were not good and in particular, the leak current of the electrolytic capacitor after applying thereto a D.C. voltage in a high humidity atmosphere was greatly higher than the values of the electrolytic capacitors of the present invention obtained in the above-described examples.

COMPARATIVE EXAMPLE 2

By following the same procedure as in Example 4 except that the second polymer was not used, an electrolytic capacitor was prepared and the characteristics were evaluated by the same manners as above. The results are shown in Table 1 below.

As shown in the Table, the capacitance efficiency and tan δ were good but the leak current was higher than 0.1 CV.

TABLE 1

| Sample No. | Second Polymer Kind | Group | Capacitance efficiency (%) | tan δ (%) | Leak current (μm) (I) CV | (II) CV |
|---|---|---|---|---|---|---|
| 1 | A-1 | a | 97 | 9.7 | 0.14 | 0.0023 |
| 2 | A-2 | a | 96 | 10 | 0.24 | 0.0028 |
| 3 | A-3 | a | 97 | 9.2 | 0.23 | 0.0015 |
| 4 | A-4 | a | 91 | 11 | 0.066 | 0.0020 |
| 5 | A-5 | a | 95 | 11 | 0.096 | 0.0061 |
| 6 | A-6 | a | 96 | 12 | 0.057 | 0.0045 |
| 7 | A-7 | b | 97 | 7.6 | 1.95 | 0.033 |
| 8 | A-8 | b | 99 | 6.0 | 2.32 | 0.0072 |
| 9 | A-9 | c | 99 | 7.5 | 0.0057 | 0.00058 |
| 10 | A-10 | c | 100 | 7.2 | 0.016 | 0.0021 |
| 11 | A-11 | d | 99 | 8.5 | 3.16 | 0.0048 |
| 12 | A-12 | e | 98 | 6.7 | 0.71 | 0.0046 |
| 13 | A-13 | e | 100 | 8.8 | 6.99 | 0.0072 |
| 14 | A-14 | e | 93 | 15 | 0.71 | 0.0045 |
| 15 | B-1 | | 86 | 20 | 1.80 | 0.70 |
| 16 | none | | 99 | 6.1 | 0.19 | 0.052 |

In TABLE 1:
(I): Before the application of electric voltage under a high humidity.
(II): After the application of electric voltage under a high humidity.
A-1: Saturated polyester resin, "VYLON RV-550", trade name, made by Toyobo Co., Ltd.
A-2: Saturated polyester resin, "elitel UE-3202, trade name, made by Unitika Ltd.
A-3: Saturated polyester resin, "elitel UE-3203, trade name, made by Unitika Ltd.
A-4: Saturated polyester resin, "elitel UE-3400, trade name, made by Unitika Ltd.
A-5: Saturated polyester resin, "elitel UE-3500, trade name, made by Unitika Ltd.
A-6: Polyarylate, "Crystalate A-801", trade name, made by Kanegafuchi Chemical Industry Co., Ltd.
A-7: Polyvinyl acetate, "Goseneal PV-500", trade name, made by The Nippon Synthetic Chemical Industry Co., Ltd.
A-8: Methyl polymethacrylate, "PMMA-LO", trade name, made by Sumitomo Chemical Comapny, Limited.
A-9: Polyamide resin, "CX-3000, trade name, made by Unitika Ltd.
A-10: Methoxymethyalted polyamide resin, "FR-301", trade name, made by Namariichi K.K.
A-11: Polyvinylpyrrolidone, "PVP", trade name, made by ISP.
A-12: Ethyl cellulose, "N-100", trade name, made by Hercules Incorporated.
A-13: Ethylhydroxyethyl cellulose, "EHEC High", trade name, made by Hercules Incorporated.
A-14: Cellulose acetate butyrate, "CAB 551-0.01", trade name, made by Hercules Incorporated.
B-1: Polyimiade, "ULTEM", trade name, made by General Electric Company.
a: Polymer having an ester group at the main chain.
b: Polymer having an ester group at the side chain.
c: Polymer having an amido group at the main chain.
d: Polymer having an amido group at the side chain.
e: Cellulose derivative.
Sample Nos. 1 to 14: Samples of the invention.
Sample Nos. 15 and 16: Comparison samples.

EXAMPLE 5

By following the same procedure as in Example 4 except that the polyamide resin, "CX-3000" (trade name, made by Unitika Ltd.) having a polyamido group at the main chain was used as the second polymer and the addition ratio of the polyamide resin to the polyaniline was changed variously, each of electrolytic capacitors was prepared and the characteristics of them were evaluated. The results are shown in Table 2 below.

TABLE 2

| Addition amount of polyamide resin (weight %)* | Capacitance efficiency (%) | tan δ (%) | Leak current (μA) (I) (CV) | (II) (CV) |
|---|---|---|---|---|
| 0 | 99 | 6.1 | 0.19 | 0.052 |
| 11 | 98 | 8.1 | 0.98 | 0.024 |
| 25 | 98 | 5.7 | 0.28 | 0.0042 |
| 54 | 100 | 5.5 | 0.019 | 0.0016 |
| 100 | 99 | 7.5 | 0.0057 | 0.00058 |
| 186 | 100 | 14 | 0.026 | 0.0015 |
| 300 | 95 | 18 | 0.015 | 0.0010 |
| 400 | 65 | 210 | 0.0058 | 0.00070 |

*Ratio to the weight of the polyamine
(I): Before the application of voltage.
(II): After the application of voltage.

The results in the above table shows that if the range from that the leak current after appying a D.C. voltage under the high humidity atmosphere becomes below 0.05 CV to that the electric conductivity by the mixture with the insulating polymer becomes unobtainable and tan δ does not over 20% is the range of the present invention, the preferred addition range of the second polymer is from 20 to 300% by weight based on the weight of the polyaniine.

While the invention has been described in detail and with reference to specific embodiments thereof, it will be apparent to one skilled in the art that various changes and modifications can be made therein without deprating from the spirit and scope thereof.

What is claimed is:

1. A solid electrolytic capacitor comprising a film-forming metal, a dielectric oxide film formed thereon, and an electrically conductive composite polymer film formed on the dielectric oxide film as a solid electrolyte, the electrically conductive composite polymer film comprising
    (a) a polyaniline as a first polymer soluble in an organic solvent in an undoped state, which is a polymer having a quinonediimine structural unit and a phenylenediamine structural unit represented by following formula (I) as the main repeating unit;

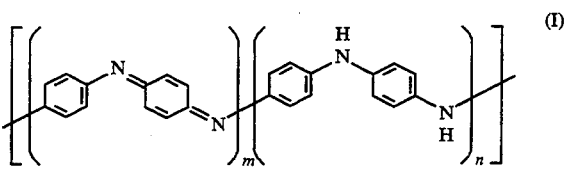

wherein m and n are the molar fractions of the quinonediimine structural unit and the phenylenediamine structural unit, respectively, and $0<m<1$, $0<n<1$, and $m+n=1$,
    (b) a second polymer selected from a polymer having a structure containing an ester group or an amido group in a main chain or a side chain as the main repeating unit and a cellulose derivative, and
    (c) a protonic acid having a pKa value of 4.8 or less.

2. A solid electrolytic capacitor of claim 1, wherein the polyaniline soluble in an organic solvent has an intrinsic viscosity [η] measured in N-methyl-2-pyrrolidone at 30° C. of at least 0.40 dl/g.

3. A solid electrolytic capacitor of claim 1, wherein the electrically conductive composite polymer film contains the second polymer in an amount of from 10 to 400% by weight based on the weight of the polyaniline.

4. A process of producing the solid electrolytic capacitor as claimed in claim 1, which comprises subjecting the solid electrolytic capacitor to an aging treatment by applying thereto a D.C. voltage under an atmosphere of a relative humidity of at least 80%.

* * * * *